United States Patent
Alp et al.

(10) Patent No.: US 7,740,964 B2
(45) Date of Patent: Jun. 22, 2010

(54) ADAPTIVE ANODE NITROGEN MANAGEMENT CONTROL

(75) Inventors: Abdullah B. Alp, Rochester, NY (US); Victor W. Logan, Naples, NY (US); John P. Salvador, Penfield, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1114 days.

(21) Appl. No.: 11/397,774

(22) Filed: Apr. 4, 2006

(65) Prior Publication Data
US 2007/0231636 A1 Oct. 4, 2007

(51) Int. Cl.
*H01M 8/04* (2006.01)
(52) U.S. Cl. .............................. 429/22; 429/13; 429/34; 429/23
(58) Field of Classification Search .................. 429/22
See application file for complete search history.

(56) References Cited
U.S. PATENT DOCUMENTS
2005/0181249 A1* 8/2005 Logan .......................... 429/22
* cited by examiner

*Primary Examiner*—Patrick Ryan
*Assistant Examiner*—Brent Thomas

(57) ABSTRACT

A method is provided for controlling the concentration of nitrogen in a fuel cell stack. The method includes providing a fuel cell stack with cathode passages and anode passages including a valve in communication with the anode passages. The method further comprises selecting a maximum desired amount of nitrogen to be found in the fuel cell stack and calculating an actual amount of nitrogen in the fuel cell stack. Next, the method provides for comparing the maximum desired amount of nitrogen in the fuel cell stack to the actual amount of nitrogen in the fuel cell stack, and opening the valve if the actual amount of nitrogen in the fuel cell stack is greater than the maximum desired amount of nitrogen in the fuel cell stack. The method calculates the actual amount of nitrogen in the fuel cell stack based on an amount of nitrogen that enters the anode passages due to an age of the fuel cell stack.

13 Claims, 5 Drawing Sheets

ADAPTIVE ANODE NITROGEN MANAGEMENT CONTROL

FIELD OF THE INVENTION

The present invention relates to fuel cell systems, and more particularly, to a system for adaptive anode nitrogen management control.

BACKGROUND OF THE INVENTION

In proton exchange membrane (PEM) type fuel cells, the hydrogen-based feed gas is supplied to an anode of the fuel cell and an oxidant is supplied to a cathode of the fuel cell. PEM fuel cells include a membrane electrode assembly (MEA) comprising a thin, proton transmissive, non-electrically conductive, solid polymer membrane-electrolyte having the anode on one of its faces and the cathode on the opposite face. The MEA is sandwiched between a pair of electrically conductive elements which serve as current collectors for the anode and cathode and contain appropriate channels and/or openings therein for distribution of the fuel cell's gaseous reactants over the surfaces of the respective anode and cathode catalysts.

Typically, atmospheric air is used as the oxidant in PEM systems. Primarily, air comprises nitrogen and oxygen, among other chemical compounds. When air is used as the oxidant in the PEM, the force of the partial pressure of the nitrogen in the air across the PEM will drive some of the nitrogen in the air to permeate through the PEM into the anode. In addition, over time, passages may develop in the MEA which facilitate an additional flow of nitrogen into the anode. The nitrogen that permeates into the anode dilutes the hydrogen based feed gas, thus reducing the efficiency of the PEM fuel cell.

Generally, in order to improve the efficiency of the PEM due to the diluted hydrogen feed gas, the nitrogen diluted hydrogen feed gas is removed from the anode at regular intervals. Typically, an evacuation valve is used to enable the diluted hydrogen feed gas to exit the anode of the PEM. This process, however, results in the waste of hydrogen feed gas as the amount of nitrogen in the anode is hard to predict. Accordingly, it is desirable to create a system to accurately determine the amount of nitrogen in the hydrogen feed gas to reduce the waste of hydrogen feed gas.

SUMMARY OF THE INVENTION

The present invention provides a method for controlling the concentration of nitrogen in a fuel cell stack. The method includes providing a fuel cell stack with a cathode and an anode including a valve in communication with the anode passages. The method further comprises selecting a desired maximum amount of nitrogen to be found in the fuel cell stack and calculating an actual amount of nitrogen in the fuel cell stack. Next, the method provides for comparing the desired maximum amount of nitrogen in the fuel cell stack to the actual amount of nitrogen in the fuel cell stack, and opening the valve if the actual amount of nitrogen in the fuel cell stack is greater than the desired maximum amount of nitrogen in the fuel cell stack. The method calculates the actual amount of nitrogen in the fuel cell stack based on an amount of nitrogen that enters the anode due to an age of the fuel cell stack.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF VARIOUS EMBODIMENTS

The following description of various embodiments is merely exemplary in nature and is in no way intended to limit the invention, its application, or uses. Although the following exemplary description refers to the use of an adaptive anode nitrogen management control for a fuel cell system in a vehicle, it will be understood that the present invention may be applicable to other types of energy generation devices for use in many other types of equipment. It will be further understood that while the following description will relate to the use of a hydrogen feed gas for a fuel cell system, it should be noted that numerous other fuels could be employed, and further, the foregoing description is understood to not limit the appended claims.

Figure 1:
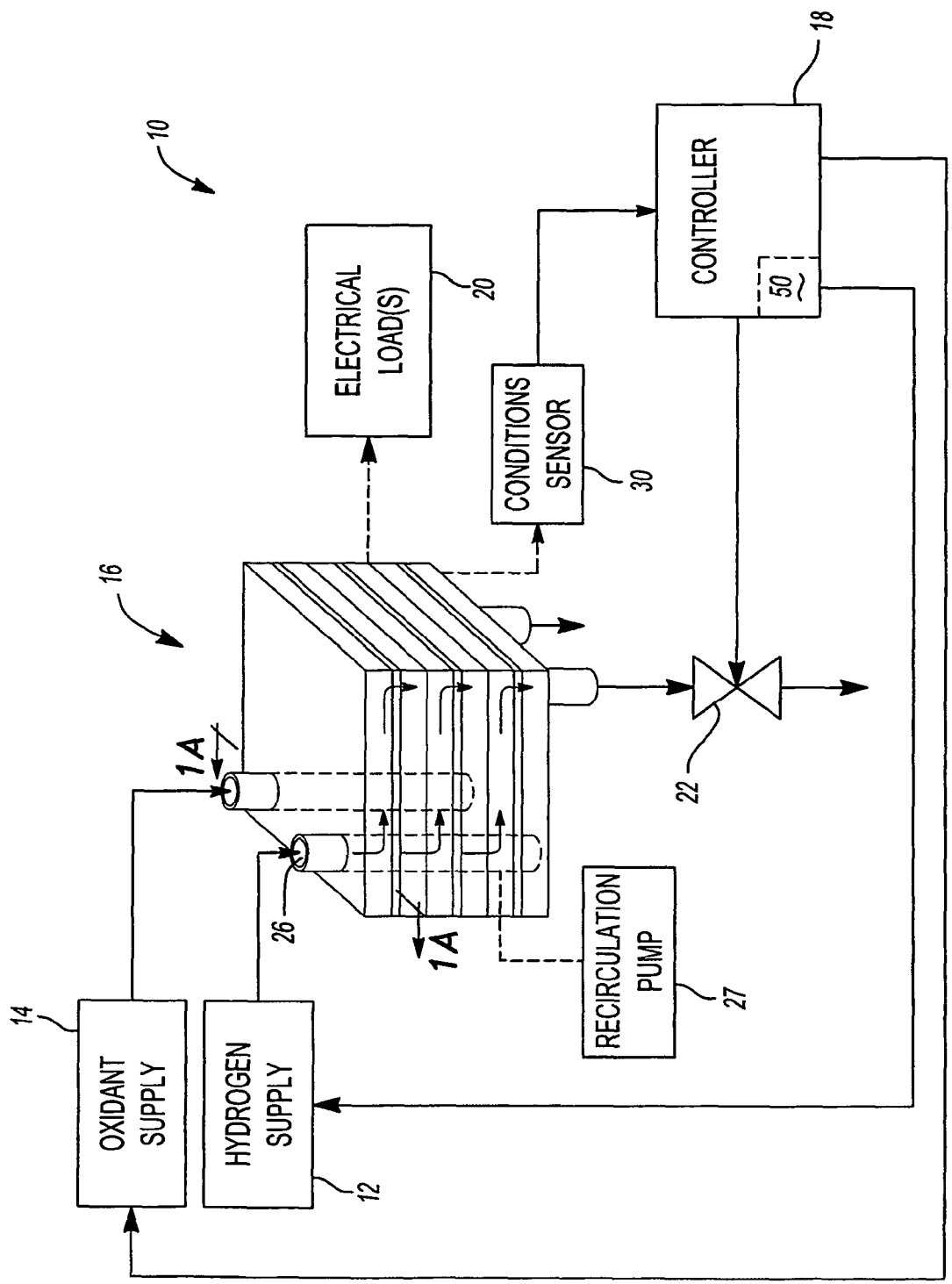
FIG. 1 is a schematic illustration of a fuel cell system including a fuel cell stack with an adaptive anode nitrogen management control system according to the present invention.

With reference to FIG. 1, a fuel cell system 10 is shown. The fuel cell system 10 includes a hydrogen-based feed gas supply or hydrogen supply 12 and an oxidant gas supply 14 coupled to a fuel cell stack 16. A controller 18 is in communication with the hydrogen supply 12, the oxidant gas supply 14 and the fuel cell stack 16. The fuel cell stack 16 produces electrical power to power an electrical load or loads 20. The electrical load(s) 20 can include an electric motor, lights, heaters or any other type of electrically powered components. The fuel cell stack 16 is further coupled to a purge valve 22.

The fuel cell stack 16 typically includes cathode passages 24 and anode passages 26 separated by a membrane assembly 28. It should be noted that in FIG. 1A, only one membrane assembly 28 is shown for simplification purposes, however, the fuel cell stack 16 includes a plurality of membrane assemblies 28, as shown in FIG. 1, each with anode and cathode passages on opposite sides thereof as is known in the art. The fuel cell stack 16 may also include at least one condition sensor 30. The cathode passages 24 of the fuel cell stack 16 are coupled to the oxidant gas supply 14. The oxidant gas supply 14 is operable to furnish an oxygen-based fuel, generally air, to the cathode passages 24. The anode passages 26 are coupled to the hydrogen supply 12 for receipt of a hydrogen feed gas, such as pure hydrogen. The anode passages 26 are further fluidly coupled to the purge valve 22, as will be discussed in greater detail below. The anode passages 26 may also be in communication with a recirculation pump 27 to aid in reacting the hydrogen gas with the membrane assembly 28. The recirculation pump 27 can be used to feed flow of the anode passages 26 from an anode passage outlet (not specifically shown) back into an inlet of the anode passages 26 to increase anode inlet humidification and increase the flow velocity in the anode passages 26.

The membrane assembly 28 includes a first side 34 exposed to the cathode passages 24 and a second side 36 exposed to the anode passages 26. As generally known, the membrane assembly 28 comprises a thin, proton transmissive, non-electrically conductive, solid polymer membrane-electrolyte 38. The membrane-electrolyte 38 may be sandwiched between a pair of electrically conductive elements 40 which each serve as current collectors for the fuel cell stack 16. The electrically conductive elements 40 may define appropriate channels and/or openings (not specifically shown) which define the cathode passages 24 and anode passages 26 to interact with a catalyst (not specifically shown) disposed on the membrane-electrolyte 38. The catalyst reacts with the oxidant gas from the cathode passages 24 and hydrogen gas from the anode passages 26 to create electrical energy and water, as generally known in the art. Over time, due to the age of the fuel cell stack 16, leak paths 44 may form in the membrane assembly 28. The leak paths 44, in combination with an air-based oxidant fuel, enable additional nitrogen molecules to permeate into the anode passages 26, thereby diluting the hydrogen fuel in the anode passages 26. The dilution of the hydrogen fuel in the anode passages 26 reduces the efficiency of the reaction of the hydrogen gas with the catalyst, reducing the performance of the fuel cell stack 16.

The condition sensor 30 is disposed within the fuel cell stack 16 and is operable to assist in determining the amount of nitrogen in the anode passages 26, as will be described in greater detail below. The condition sensor 30 is in communication with the controller 18. Generally, the condition sensor 30 is operable to measure the temperature, pressure, voltage and various other desired operating conditions within the fuel cell stack 16. Although the condition sensor 30 is described herein as one sensing mechanism, it will be understood that a plurality of sensors (not shown) could be employed to measure various characteristics of the fuel cell stack 16, and also that various sensors could be disposed in either the cathode passages 24 or anode passages 26 of the fuel cell stack 16 to measure particularized operating conditions if so desired.

The purge valve 22 is fluidly coupled to the anode passages 26 and in communication with the controller 18. The purge valve 22 is generally configured to enable the release of gases from the anode passages 26 upon a determination by the controller 18 that a concentration of nitrogen in the anode passages 26 exceeds a selected maximum value, as will be described in greater detail below.

Figure 1A:
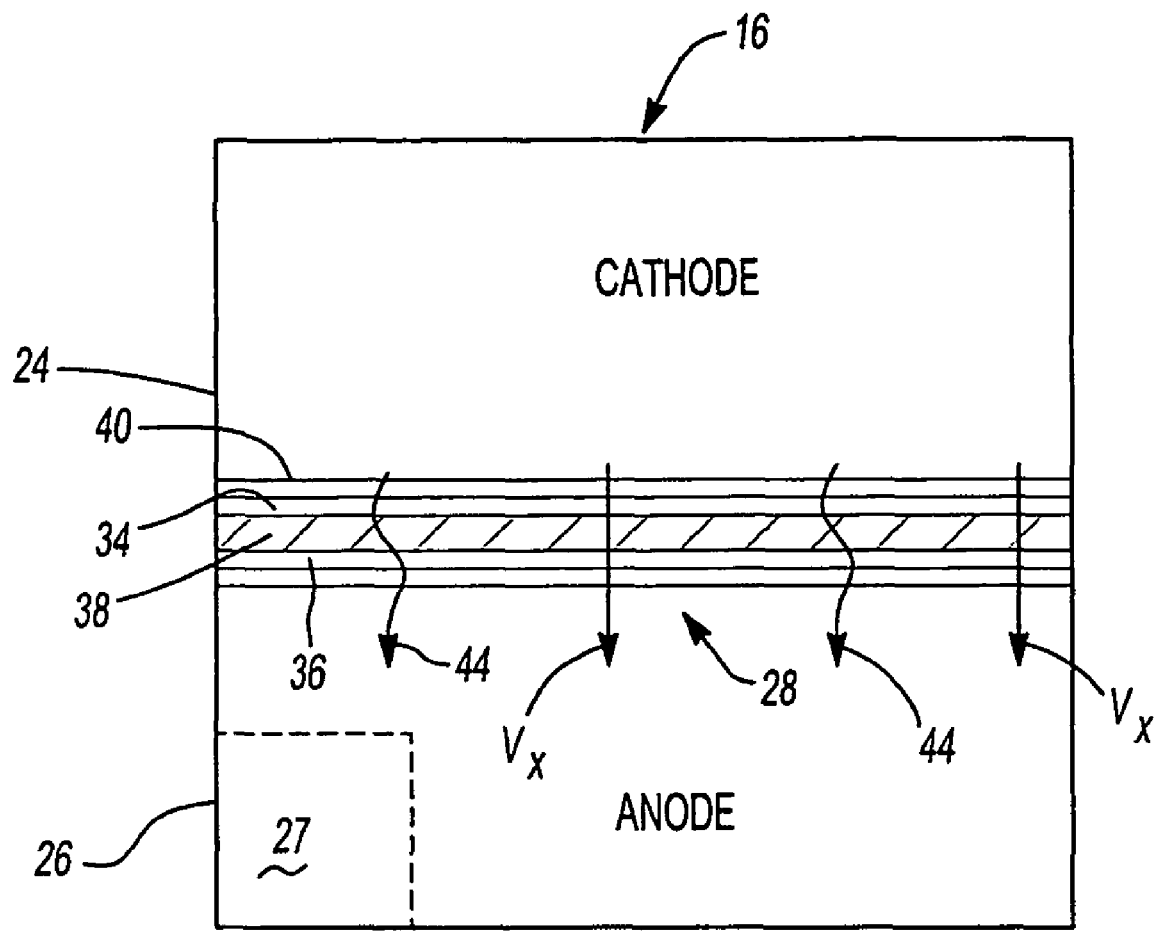
FIG. 1A is a detailed schematic view of the fuel cell stack of FIG. 1 taken along line 1A-1A.
Figure 2:
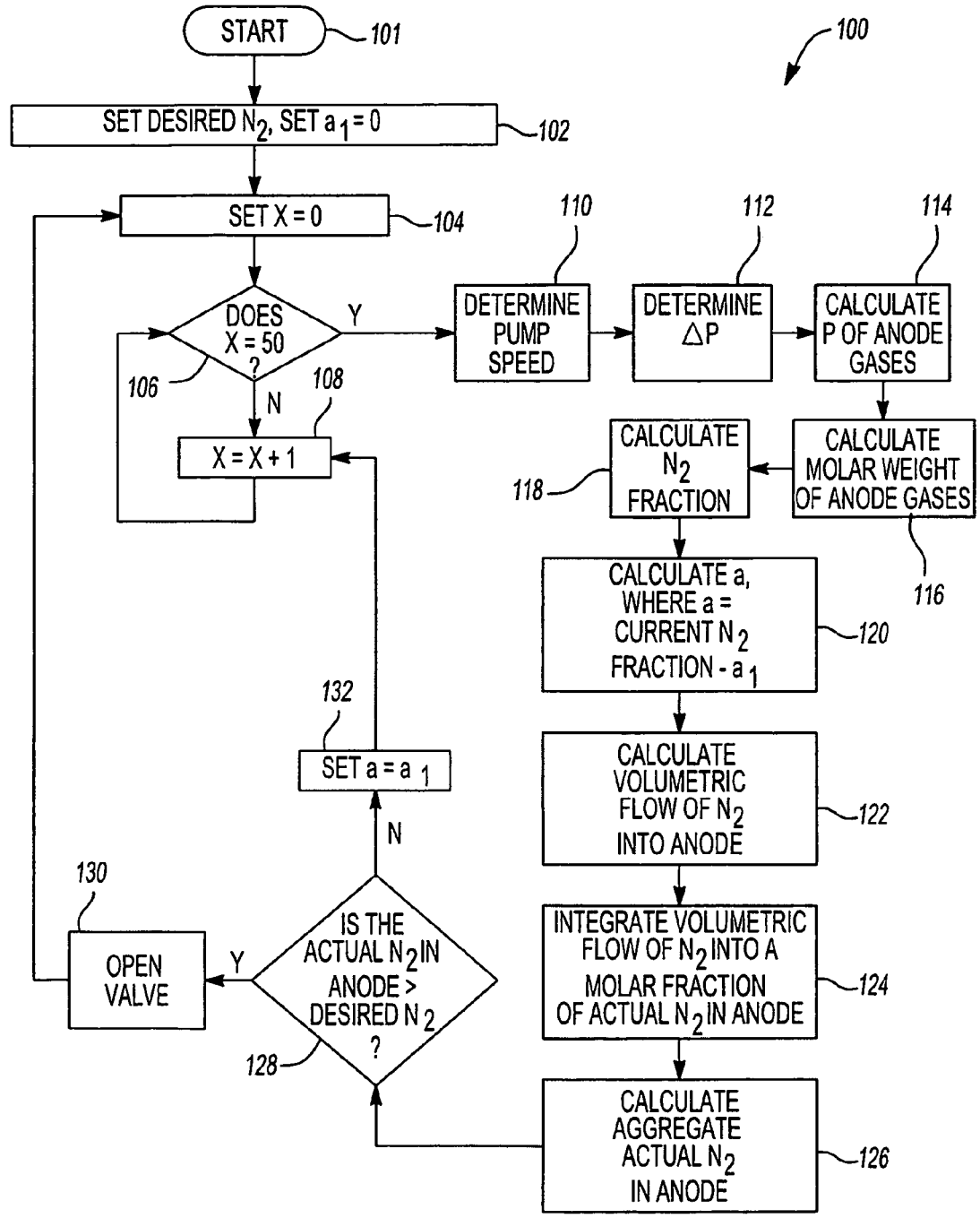
FIG. 2 is a flowchart detailing the processes of the adaptive anode nitrogen management control system according to one of various embodiments.
Figure 3:
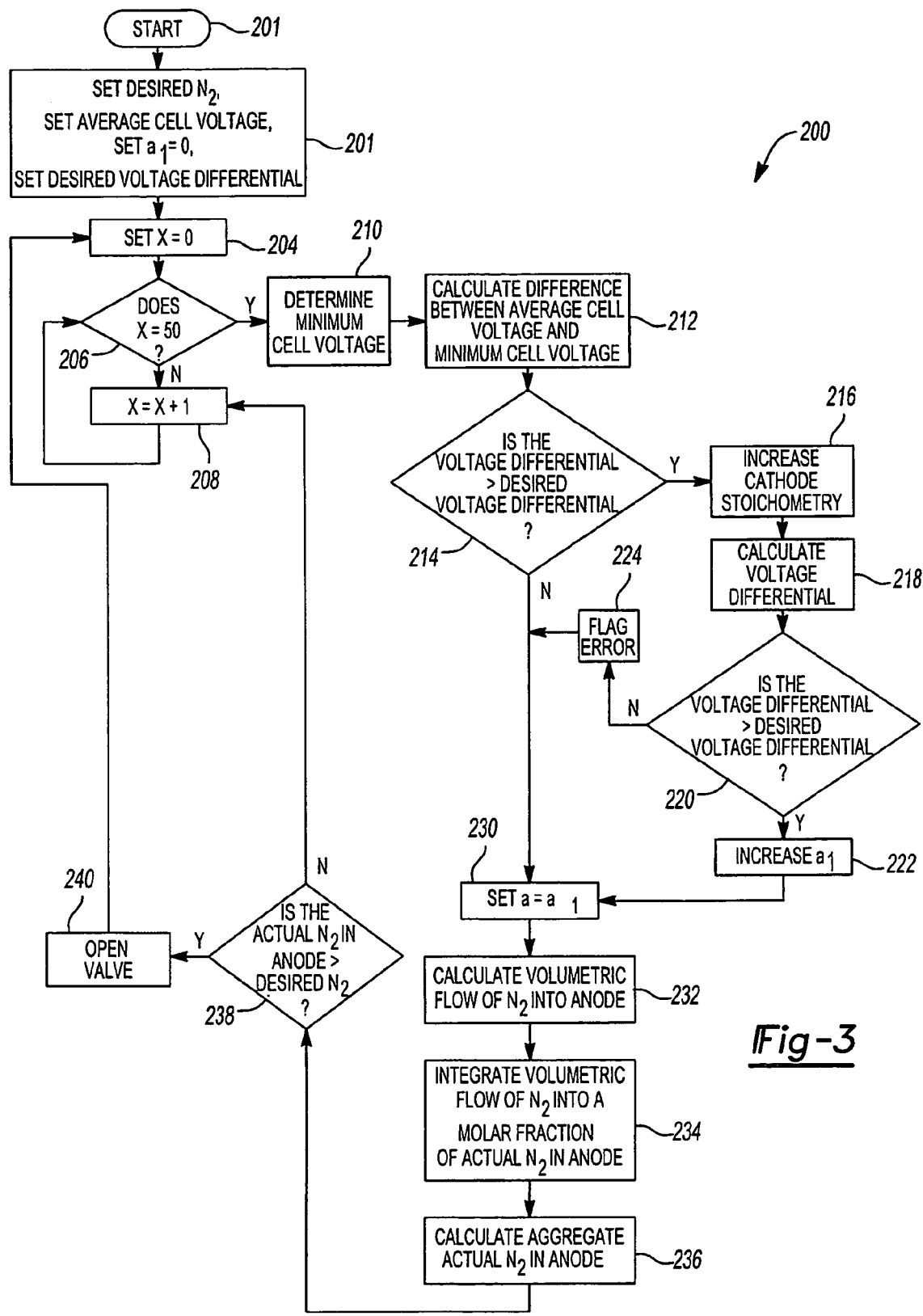
FIG. 3 is a flowchart illustrating the processes of the adaptive anode nitrogen management control system according to a second one of various embodiments.
Figure 4:
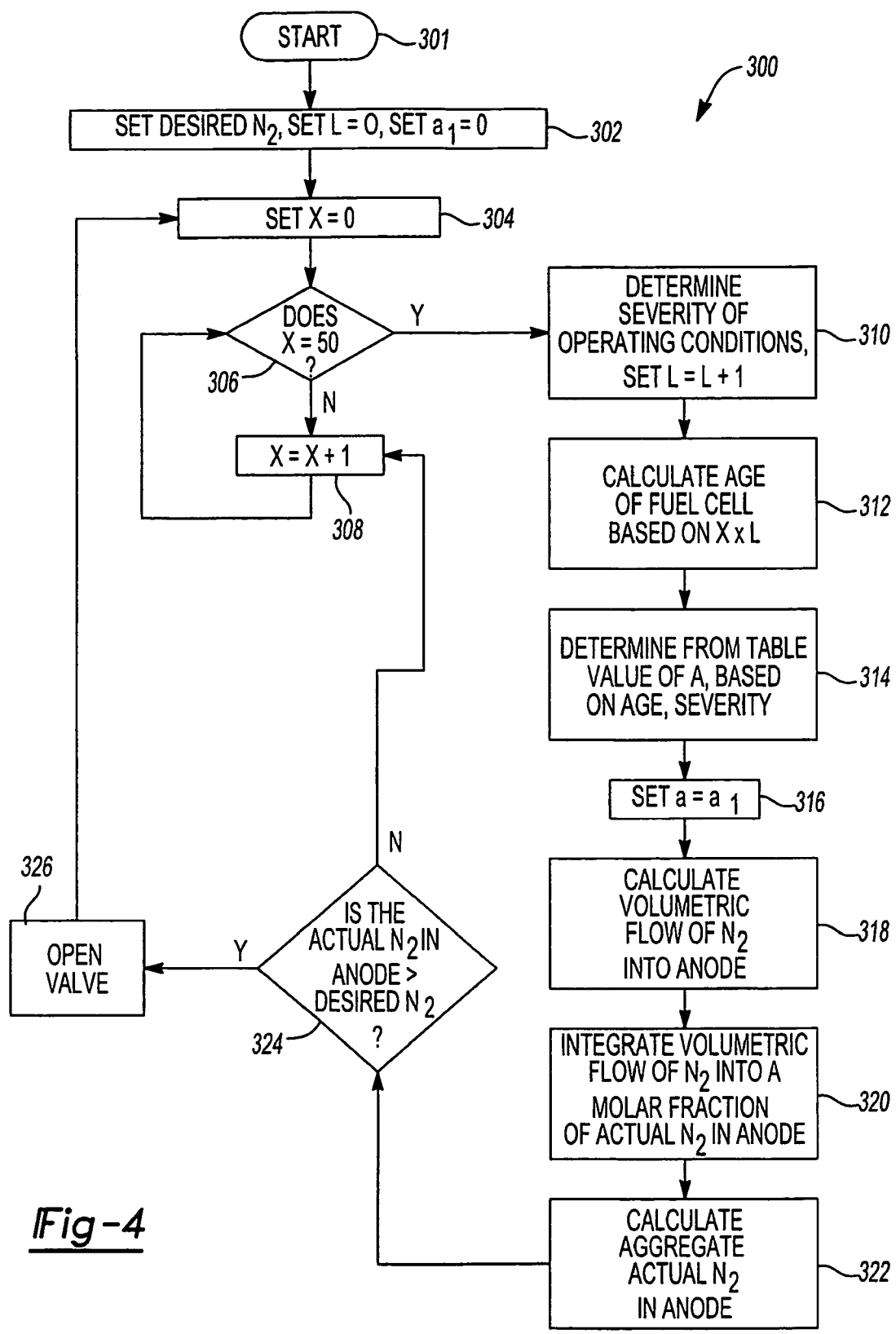
FIG. 4 is a flowchart illustrating the processes of the adaptive anode nitrogen management control system according to a third one of various embodiments.

With continuing reference to FIGS. 1 and 1A and additional reference to FIGS. 2, 3 and 4, the controller 18 may be used to calculate the actual amount of nitrogen in the anode passages 26 to determine if the purge valve 22 should be opened to decrease the nitrogen concentration in the anode passages 26. The controller 18 may also include a memory 50. In order to determine the actual nitrogen concentration in the fuel cell stack 16, the controller 18 may determine a permeation value $V_x$ and a crossover correction factor a. The permeation value $V_x$ represents the amount of nitrogen which diffuses into the anode passages 26 due to the partial pressure of the nitrogen as best shown in FIG. 1A. The crossover correction factor "a" represents the amount of nitrogen which diffuses into the anode passages 26 due to leak paths 44 in the membrane assembly 28. As the amount of nitrogen which diffuses into the anode passages 26 due to the leak paths 44 is generally very small, the crossover correction factor "a" does not need to be calculated in real time, and may be calculated at various selected operating intervals, such as every 50 hours of run time of the fuel cell stack 16.

According to one of the various embodiments, with additional reference to FIG. 2, a method 100 may be used by the controller 18 to calculate the concentration of the nitrogen in the anode passages 26. It should be noted that this method 100 starts when the fuel cell stack 16 has no operational hours on it, and that the method 100 may be modified as desired to take into account a fuel cell stack (not shown) which may have additional operating hours on it.

The controller 18 begins at step 101. In a first step 102, a desired nitrogen concentration is entered into the controller 18, and an initial nitrogen fraction $a_1$ is set to zero. Typically, the desired amount of nitrogen ranges between 10-40%. Next, in step 104, a counter, X, is set to zero. In step 106, the controller 18 determines if the value of the counter X is equal to a particular time increment, such as 50 run hours of the fuel cell stack 16. Although the method described herein discloses 50 hours as an appropriate time increment, it should be noted that any time increment could be used depending upon the particular fuel cell stack 16. If the counter X is not equal to the desired time increment, in step 108 the controller 18 increments the counter X after the passing of a particular period of time.

If the counter X is equal to the desired run time of the fuel cell stack 16, such as 50 hours, then the controller 18 determines the pump speed "n" of the recirculation pump 27 of the anode passages 26 in step 110. As will be described in greater detail below, the pump speed "n" may be used to calculate the pump work, which will increase as the concentration of the nitrogen increases, as the density of the anode gases (hydrogen and nitrogen) will increase as the nitrogen concentration increases. Next, in step 112, the controller 18 determines the change in pressure $\Delta P_{pump}$ across the recirculation pump 27. The change in pressure $\Delta P_{pump}$ may be determined by sensors within the recirculation pump 27 which are in communication with the controller 18 (not specifically shown). The change in pressure $\Delta P_{pump}$ may be measured in Pascal (Pa). In step 114, the controller 18 calculates the density of the anode gases. The density of the gases in the anode passages 26 may be determined by the equation:

$$\rho_{mixture} = \frac{2 * \Delta P_{pump}}{\Psi * (nD\pi)^2} \tag{1}$$

Where $\rho_{mixture}$ is the density of the mixture in kilograms (kg) per cubic meter ($M^3$), $\Psi$ is the volume flow coefficient of the recirculation pump 27 in gallons per minute (gpm), which is a feature specific to the particular recirculation pump 27, and D is the diameter of the recirculation pump 27 in meters (m). Next, in step 116, the controller 18 may calculate the molar weight of the gases in the anode passages 26. The molar weight of the gases in the anode passages 26 may be calculated by:

$$MW_{mixture} = \frac{\rho_{mixture} * R * T}{P} \tag{2}$$

Where R is the gas constant, in Joules per kilogram Kelvin (J/kgK) defined as:

$$R = \frac{\lambda}{M_{gas}} \tag{3}$$

in which λ is the universal gas constant and $M_{gas}$ is the molecular weight of the ideal gas or gas mixture which is generally known in the art. In Equation (2), T represents the temperature in Kelvin (K) of the gases in the anode passages 26, and P is the pressure in the anode passages 26.

Next, in step 118, the controller 18 can calculate the nitrogen fraction in the gases of the anode passages 26. In order to calculate the nitrogen fraction, the following equations may be employed:

$$(\text{frac\_H}_2)_{mixture} + (\text{frac\_N}_2)_{mixture} + (\text{frac\_H}_2\text{O})_{mixture} = 1 \quad (4)$$

$$(\text{frac\_H}_2)_{mixture} * MW_{H_2} + (\text{frac\_N}_2)_{mixture} * MW_{N_2} + (\text{frac\_H}_2\text{O})_{mixture} * MW_{H_2O} = MW_{mixture} \quad (5)$$

Assuming a certain fraction of $H_2$ in the anode passages 26, and where $MW_{H_2}$ is the molar weight of hydrogen, $MW_{N_2}$ is the molar weight of nitrogen, and $MW_{H_2O}$ is the molar weight of water, solving Equation (4) and Equation (5) can determine the fraction of nitrogen (frac_$N_2$) in the mixture of gases in the anode passages 26. In step 120, the controller 18 can calculate the bleed rate correction factor "a", where the bleed rate correction factor "a" is equivalent to the difference between the current fraction of nitrogen (frac_$N_2$) calculated in step 118 and the initial nitrogen fraction $a_1$. Then the controller 18 may calculate the volumetric flow $V_i$ of the nitrogen into the anode passages 26 in step 122. The volumetric flow $V_i$ of the nitrogen in the anode passages 26 is equal to the sum of the bleed rate correction factor "a" and the cross-over nitrogen concentration, $V_x$, which can be represented as:

$$V_i = 10^{-10} \frac{P_i * A * \Delta p_i}{t} + a \quad (6)$$

where $V_i$ is the volumetric flow of nitrogen into the anode passages 26 in cubic centimeters degrees Celsius at one atmosphere per second (cm³(0° C., 1 atm)/sec). $\Delta p_i$ is the partial pressure differential of the nitrogen gas across the membrane assembly 28 in centimeters of Mercury (cmHg) and t is the thickness (cm) of the membrane assembly 28 in centimeters. A is the membrane area in centimeters squared (cm²), t is the membrane thickness in centimeters (cm), and $P_i$ is the permeation coefficient, which can be of the form:

$$P_i = A \exp{-B/T} \quad (7)$$

where T is in temperature, and A and B are dependent upon the membrane material. $P_i$ can be given in (mol/sec)*cm/(cm²*atm) or barriers. A barrier is:

$$\text{barrier} = 10^{-10} \frac{(\text{cm}^3(0° \text{ C., 1atm})/\text{sec}) * \text{cm}}{\text{cm}^2 * cmHg} \quad (8)$$

The conversion factor from the barrier unit to this unit system is:

$$3.39 * 10^{-13} * P_i(\text{barrer}) = P_i((\text{mol/sec})*\text{cm}/(\text{cm2*atm})) \quad (9)$$

Next, in step 124, the controller 18 may integrate the volumetric flow $V_i$ of the nitrogen into a molar fraction of the actual amount of nitrogen in the anode passages 26. Then, the controller 18 may calculate the aggregate actual amount of nitrogen in the anode passages 26 in step 126. In step 128, the controller 18 determines if the actual aggregate amount of nitrogen in the anode passages 26 exceeds the desired maximum amount of nitrogen in the anode passages 26. If the controller 18 determines the actual amount of nitrogen in the anode passages 26 exceeds the desired maximum amount of nitrogen, then in step 130, the controller 18 will open the purge valve 22 to release the diluted gases from the anode passages 26 and signal the hydrogen supply 12 to provide fresh gas to the anode passages 26. The controller 18 then loops to step 104.

If the amount of actual nitrogen in the anode passages 26 does not exceed the desired maximum amount of nitrogen in the anode passages 26, the controller 18 in step 132 will set the current nitrogen fraction to equal $a_1$, to facilitate the next calculation of the bleed rate correction factor "a". Then, the controller 18 loops to step 108.

Alternatively, according to a second one of the various embodiments, with reference to FIG. 1 and FIG. 3, the controller 18 may determine the amount of nitrogen entering the anode passages 26 via leak paths 44 by a voltage differential process step 200. The controller 18 begins at step 201. In step 202, a desired nitrogen concentration is entered into the controller 18, an initial nitrogen fraction $a_1$ is set to zero, an average voltage of the fuel cell stack 16 is set and the desired voltage differential is set. Typically, the desired amount of nitrogen is between thirty and forty percent. Next, in step 204, a counter, X, is set to zero. In step 206, the controller 18 determines if the value of the counter X is equal to a particular time increment, such as 50 run hours of the fuel cell stack 16. If the counter X is not equal to the desired time increment, in step 208 the controller 18 increments the counter X after the passing of a particular period of time.

If the counter X is equal to the desired increment of time, then in step 210 the controller 18 determines the minimum voltage of the fuel cell stack 16. The minimum voltage can be measured or calculated from partial sampling and/or statistics which could be gathered from the conditions sensor 30. Next, in step 212, the controller 18 can calculate a voltage differential between the average voltage of the fuel cell stack 16 and the minimum voltage of the fuel cell stack 16. In step 214, the controller 18 determines if the voltage differential calculated in step 212 exceeds the desired voltage differential.

If the voltage differential calculated in step 212 exceeds the desired voltage differential, then the controller 18 will increase the cathode stoichiometry in step 216 to determine if there is an oxygen starvation issue in the cathode passages 24. In step 218, the controller 18 re-calculates the actual voltage differential. Next, in step 220, the controller 18 determines if the re-calculated voltage differential exceeds the desired voltage differential. If the voltage differential still exceeds the desired voltage differential, then the controller 18 incrementally increases the value of $a_1$ in step 222. If the voltage differential does not exceed the desired voltage differential, then the controller 18 flags an error in step 224 as there may be an issue with the cathode passages 24. After the completion of step 222 or step 224, the controller 18, in step 230, sets the value of "a" equal to the value of $a_1$. Next, in step 232, the controller 18 determines the volumetric flow of the nitrogen into the anode passages 26 based on the bleed rate and cross-over, as discussed in step 122 above. The controller 18 then may integrate the volumetric flow $V_i$ of the nitrogen into a molar fraction of the actual amount of nitrogen in the anode passages 26 in step 234. Next, in step 236, the controller 18 may calculate the aggregate actual amount of nitrogen in the anode passages 26.

In step 238, the controller 18 determines if the actual aggregate amount of nitrogen in the anode passages 26 exceeds the desired maximum amount of nitrogen in the anode passages 26. If the controller 18 determines the actual amount of nitrogen in the anode passages 26 exceeds the maximum desired amount of nitrogen, then in step 240, the controller 18 will open the purge valve 22 to release the diluted gases from the anode passages 26 and signal the hydrogen supply 12 to provide fresh gas to the anode passages 26. The controller 18 then loops to step 204. If the actual aggregate amount of nitrogen in the anode passages 26 does not exceed the desired amount of nitrogen in the anode passages 26, then the controller 18 loops to step 208.

With continuing reference to FIG. 1 and additional reference to FIG. 4, according to a third one of various embodiments, a method 300 may be employed by the controller 18 to determine the bleed rate correction factor "a". The controller 18 begins at step 301. In step 302, a desired nitrogen concentration is entered into the controller 18, an initial nitrogen fraction $a_1$ is set to zero and a life of the fuel cell L is set to zero. Typically, the desired amount of nitrogen is between thirty and forty percent. Next, in step 304, a counter, X, is set to zero. In step 306, the controller 18 determines if the value of the counter X is equal to a particular time increment, such as 50 run hours of the fuel cell stack 16. If the counter X is not equal to the desired time increment, in step 308 the controller 18 increments the counter X after the passing of a particular period of time.

If the counter X is equal to the desired increment of time, then in step 310 the controller 18 determines the severity of the operating conditions of the fuel cell stack 16 based on input from the conditions sensor 30, and the life L is incremented. Next, in step 312, the controller 18 may calculate the age of the fuel cell stack 16 based on the counter X multiplied by the life L. In step 314, the controller 18 determines the value of $a_1$ from a table stored in the memory 50. The table (not shown) may identify appropriate values of $a_1$ based on the value of the age and operating conditions of the fuel cell stack 16. The table may be determined by mapping the rate of nitrogen cross-over for a variety of fuel cell stacks 16.

In step 316, the controller 18 may set "a" equal to the value of $a_1$ determined from the table. Then, in step 318, the controller 18 may calculate the volumetric flow $V_i$ of the nitrogen into the anode passages 26 based on the bleed rate correction factor "a" and cross-over rate, as discussed in step 122 above. Next, the controller 18 then may integrate the volumetric flow $V_i$ of the nitrogen into a molar fraction of the actual amount of nitrogen in the anode passages 26 in step 320. In step 322, the controller 18 may calculate the aggregate actual amount of nitrogen in the anode passages 26.

In step 324, the controller 18 determines if the actual aggregate amount of nitrogen in the anode passages 26 exceeds the desired amount of nitrogen in the anode passages 26. If the controller 18 determines the actual amount of nitrogen in the anode passages 26 exceeds the desired amount of nitrogen, then in step 326, the controller 18 will open the purge valve 22 to release the diluted gases from the anode passages 26 and signal the hydrogen supply 12 to provide fresh gas to the anode passages 26. The controller 18 then loops to step 304. If the actual aggregate amount of nitrogen in the anode passages 26 does not exceed the desired amount of nitrogen in the anode passages 26, then the controller 18 loops to step 308.

Thus, the methods 100, 200, 300 according to the various embodiments facilitate an accurate determination of the amount of nitrogen in the anode passages 26 of the fuel cell stack 16 to reduce the waste of the hydrogen fuel while improving the efficiency of the fuel cell stack 16. It will be understood that the various procedures and methods illustrated herein to calculate the bleed rate correction factor "a" could be altered to conform to various fuel cell stacks 16, and further the sequence of steps in the methods 100, 200, 300 could be altered if desired.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for controlling the concentration of nitrogen in a fuel cell stack, comprising:
providing a fuel cell stack with cathode passages and anode passages including a valve in communication with the anode passages and a permeable membrane having a first face adjacent to the cathode passages and a second face adjacent to the anode passages;
calculating an actual amount of nitrogen in the fuel cell stack;
comparing a predetermined maximum desired amount of nitrogen in the fuel cell stack to the actual amount of nitrogen in the fuel cell stack; and
opening the valve if the actual amount of nitrogen in the fuel cell stack is greater than the maximum desired amount of nitrogen in the fuel cell stack,
wherein calculating the actual amount of the nitrogen in the fuel cell stack includes:
determining an amount of nitrogen that enters the anode passages due to an age of the fuel cell stack;
determining a permeation coefficient of the permeable membrane; and
determining a bleed rate correction factor associated with the rate of increase of nitrogen into the anode passages.

2. The method of claim 1, wherein calculating the actual amount of nitrogen in the fuel cell stack includes calculating a crossover rate which indicates an amount of nitrogen which permeates into the anode passages from an oxidant gas and a bleed rate which indicates an amount of nitrogen which permeates into the anode passages due to the age of the fuel cell stack.

3. The method of claim 1, wherein the maximum desired amount of nitrogen in the fuel cell stack is from about thirty percent to about forty percent.

4. The method of claim 1, wherein determining the bleed rate correction factor associated with the rate of increase of nitrogen in the anode passages further comprises:
providing a recirculation pump in communication with the anode passages;
calculating a density of gases in the anode passages based on the work done by the recirculation pump;
calculating the molar weight of the gases in the anode passages from the density of the gases in the anode passages;
determining a current nitrogen fraction based on the molar weight of the mixture; and
subtracting the current nitrogen fraction from a previous nitrogen fraction to determine the correction factor.

5. The method of claim 4, wherein the bleed rate correction factor is set equal to the previous nitrogen fraction after a predetermined interval.

6. The method of claim 1, wherein determining the bleed rate correction factor associated with the rate of increase of nitrogen in the anode passages further comprises:
providing a desired fuel cell voltage differential;
determining a minimum fuel cell voltage and an average fuel cell voltage;

calculating the difference between the average fuel cell voltage and the minimum fuel cell voltage to arrive at a fuel cell voltage differential; and determining if the fuel cell voltage differential is greater than the desired fuel cell voltage differential.

7. The method of claim 6, wherein determining if the fuel cell voltage differential is greater than the desired fuel cell voltage differential further comprises:

increasing the cathode stoichiometry if the fuel cell voltage differential is greater than the desired fuel cell voltage differential; and recalculating the fuel cell voltage differential after the cathode stoichiometry was increased and incrementing the correction factor if the fuel cell voltage differential is greater than the desired fuel cell voltage differential.

8. The method of claim 1, wherein determining the correction factor associated with the rate of increase of nitrogen in the anode passages further comprises:

determining a severity of the operating conditions of the fuel cell stack;

determining an age of the fuel cell stack; and looking up a correction factor based on the age of the fuel cell stack and severity of the operating conditions of the fuel cell stack.

9. A method for controlling the concentration of nitrogen in a fuel cell stack, comprising:

providing a fuel cell stack with cathode passages and anode passages including a valve in communication with said anode passages;

selecting a maximum desired amount of nitrogen to be found in the fuel cell stack;

calculating a bleed rate of the nitrogen between the cathode passages and the anode passages due to the age of the fuel cell stack;

calculating a crossover rate of nitrogen which permeates into the anode passages from an oxidant gas disposed in the cathode passages;

calculating an actual amount of nitrogen in the fuel cell stack based on the bleed rate of the nitrogen and the crossover rate;

comparing the maximum desired amount of nitrogen in the fuel cell stack to the actual amount of nitrogen in the fuel cell stack; and opening the valve if the actual amount of nitrogen in the fuel cell stack is greater than the maximum desired amount of nitrogen in the fuel cell stack, wherein the maximum desired amount of nitrogen in the fuel cell is from about thirty percent to about forty percent.

10. The method of claim 9, wherein calculating the crossover rate of the nitrogen between the cathode passages and anode passages includes:

providing a permeable membrane having a first face adjacent to the cathode passages and a second face adjacent to the anode passages; and determining a permeation coefficient of the permeable membrane.

11. The method of claim 9, wherein calculating a bleed rate of the nitrogen between the cathode passages and the anode passages due to the age of the fuel cell stack further comprises:

calculating a density of gases in the anode passages based on the work done by a recirculation pump in communication with the anode passages;

calculating the molar weight of the gases in the anode passages from the density of the gases in the anode passages;

determining a current nitrogen fraction based on the molar weight of the mixture;

subtracting the current nitrogen fraction from a previous nitrogen fraction to determine the bleed rate; and setting the correction factor equal to the previous nitrogen fraction after a predetermined interval.

12. The method of claim 9, wherein calculating a bleed rate of the nitrogen between the cathode and the anode due to the age of the fuel cell stack further comprises:

providing a desired fuel cell voltage differential;

determining a minimum fuel cell voltage and an average fuel cell voltage;

calculating the difference between the average fuel cell voltage and the minimum fuel cell voltage to arrive at a fuel cell voltage differential;

determining if the fuel cell voltage differential is greater than the desired fuel cell voltage differential;

increasing the cathode stoichiometry if the fuel cell voltage differential is greater than the desired fuel cell voltage differential; and recalculating the fuel cell voltage differential after the cathode stoichiometry was increased and incrementing the bleed rate if the fuel cell voltage differential is greater than the desired fuel cell voltage differential.

13. The method of claim 9, wherein calculating a bleed rate of the nitrogen between the cathode passages and the anode passages due to the age of the fuel cell stack further comprises:

determining a severity of the operating conditions of the fuel cell stack;

determining an age of the fuel cell stack; and looking up a bleed rate based on the age of the fuel cell stack and severity of the operating conditions of the fuel cell stack.

* * * * *